US009522481B2

(12) United States Patent
Hidaka et al.

(10) Patent No.: US 9,522,481 B2
(45) Date of Patent: Dec. 20, 2016

(54) WATER-SOLUBLE CUTTING FLUID FOR SLICING SILICON INGOTS

(75) Inventors: Aki Hidaka, Miyazaki (JP); Yoshitaka Katsukawa, Kyoto (JP); Tsuyoshi Okamoto, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 0 days.

(21) Appl. No.: 13/392,091

(22) PCT Filed: Aug. 30, 2010

(86) PCT No.: PCT/JP2010/005340

§ 371 (c)(1),
(2), (4) Date: Feb. 24, 2012

(87) PCT Pub. No.: WO2011/024486

PCT Pub. Date: Mar. 3, 2011

(65) Prior Publication Data

US 2012/0156123 A1 Jun. 21, 2012

(30) Foreign Application Priority Data

Aug. 31, 2009 (JP) ................................ 2009-199489

(51) Int. Cl.
*C09K 13/00* (2006.01)
*B28D 5/00* (2006.01)
*C10M 173/02* (2006.01)

(52) U.S. Cl.
CPC .......... *B28D 5/0076* (2013.01); *C10M 173/02* (2013.01); *C10M 2207/02* (2013.01); *C10M 2207/0225* (2013.01); *C10M 2207/04* (2013.01); *C10M 2207/0406* (2013.01); *C10M 2207/046* (2013.01); *C10M 2207/122* (2013.01); *C10M 2207/123* (2013.01); *C10M 2207/124* (2013.01); *C10M 2207/126* (2013.01); *C10M 2207/127* (2013.01); *C10M 2207/128* (2013.01); *C10M 2207/1233* (2013.01); *C10M 2207/1273* (2013.01); *C10M 2207/142* (2013.01); *C10M 2207/1403* (2013.01); *C10M 2215/042* (2013.01); *C10M 2219/044* (2013.01); *C10M 2221/04* (2013.01); *C10N 2210/01* (2013.01); *C10N 2230/06* (2013.01); *C10N 2230/18* (2013.01); *C10N 2240/401* (2013.01); *C10N 2240/50* (2013.01)

(58) Field of Classification Search
None
See application file for complete search history.

(56) References Cited

U.S. PATENT DOCUMENTS 2,844,538 A * 7/1958 Krug et al. .................. 508/549
3,223,633 A * 12/1965 Morway et al. ............. 508/512
4,214,021 A * 7/1980 Blackwell .................. 427/385.5
4,613,512 A * 9/1986 Barnett et al. ............... 426/548
6,103,271 A * 8/2000 Morrison et al. ............ 424/490
6,653,522 B1 * 11/2003 Blumenthal et al. ......... 604/361
6,673,754 B1 * 1/2004 Nabeshima et al. .......... 508/507
7,863,476 B1 * 1/2011 Berger et al. .................. 560/14
2002/0103208 A1 * 8/2002 Cereda et al. ................ 514/256
2003/0134896 A1 * 7/2003 Eustache et al. ............. 514/475
2003/0194425 A1 * 10/2003 Simon et al. ................. 424/443
2006/0018864 A1 * 1/2006 Yoshioka ................. A61K 8/44 424/70.22
2011/0112223 A1 * 5/2011 Yang et al. ..................... 524/35

FOREIGN PATENT DOCUMENTS

CN 1422938 6/2003
CN 1764712 4/2006
CN 1780901 5/2006
CN 1903968 1/2007
CN 101044230 9/2007
JP 63-168493 7/1988
JP 09-059696 3/1997
JP 11-100590 4/1999

(Continued)

OTHER PUBLICATIONS

Stahl et al, Handbook of Pharmaceutical Salts Properties, Selection, and Use, 2008, Wiley-VCH, cover, p. 335.*
Drugfuture, Sebacic Acid, Aug. 5, 2013, Drugfuture, p. 1-2.*
Colostate, Dissociation Constants of Organic Acids and Bases, Sep. 2013, colostate, 8-42, 8-49.*
JPO, JPO Machine Translation of JP2005-015617, 2013.*
Dow, Material Safety Data Sheet, May 20, 2002, Dow, p. 1-15.*
MSU, Polymers, May 9, 2014, MSU, p. 1.*
Answers.com, What is polyoxyalkylene?, May 9, 2014, Answers. com, p. 1-2.*
Martin et al, Glycols Propylene Glycols, May 25, 2007, Dow Chemical Company, date stampe and 9 pages including cover.*
Lush, LUSHopedia ingredient finnder Propylene Glycol, Feb. 18, 2008, LushUSA, one page and date stamp.*
Fujimoto, Takehiko, Introduction of new surfactants, 1996, pp. 132-133, pp. 196-199, with the corresponding pages in the English version of the literature.

(Continued)

*Primary Examiner* — Binh X Tran
*Assistant Examiner* — David Cathey, Jr.
(74) *Attorney, Agent, or Firm* — Jianq Chyun IP Office

(57) ABSTRACT

A water-soluble cutting fluid for slicing silicon ingots is characterized in that it includes a monoprotic or diprotic aliphatic carboxylic acid (A) having a carbon number (including the carbon in the carbonyl group) of 4~10, and either a polyprotic organic acid (B) with ΔpKa of 0.9~2.3 as defined by the following formula (1) or a salt (BA) of said organic acid (B) as essential components:

$$\Delta pKa=(pKa_2)-(pKa_1) \quad (1)$$

wherein the dissociation stage, at which the organic acid (B) denoted as n-protic acid $H_nA$, becomes $H_{n-1}A+H^+$ is numbered 1 with an acid dissociation constant expressed as $pKa_1$, and the dissociation stage at which the organic acid (B) becomes $H_{n-2}A+H^+$ is numbered as 2 with an acid dissociation constant expressed as $pKa_2$.

6 Claims, No Drawings

(56) References Cited

FOREIGN PATENT DOCUMENTS

| | | |
|---|---|---|
| JP | 2000-034680 | 2/2000 |
| JP | 2000-160185 | 6/2000 |
| JP | 2002-080883 | 3/2002 |
| JP | 2003-082334 | 3/2003 |
| JP | 2003-238983 | 8/2003 |
| JP | 2005-015617 | 1/2005 |
| JP | 2005-163130 | 6/2005 |
| JP | 2006-088455 | 4/2006 |
| JP | 2006-096951 | 4/2006 |
| JP | 2006-182901 | 7/2006 |
| JP | 2007-031502 | 2/2007 |
| JP | 2008-135576 | 6/2008 |
| JP | 2008-182221 | 8/2008 |
| JP | 2011-021096 | 2/2011 |
| WO | 2009/031515 | 3/2009 |
| WO | 2009/041443 | 4/2009 |

OTHER PUBLICATIONS

"1st Office Action of China Counterpart Application", with English translation thereof, issued on Feb. 27, 2013, p. 1-p. 17, in which the listed references were cited.

Takehiko Fujimoto, "Introduction to surfactants", Sanyo Chemical Industries, 2010, pp. 198-199, which is English edition of the original Japanese book (pp. 212-213, published in Jun. 11, 2007).

"Office Action of Taiwan Counterpart Application", issued on Jun. 10, 2013, p. 1-p. 6, in which three of the listed references (JP2000-160185, JP2003-238983 and CN1903968) were cited.

"Office Action of China Counterpart Application", issued on Oct. 28, 2013, p. 1-p. 9, in which the non-patent literature Organic Chemistry was cited.

"Office Action of China Counterpart Application", issued on May 8, 2014, p. 1-p. 3.

"Office Action of China Counterpart Application", issued on Sep. 19, 2014, p. 1-p. 7, in which one of the listed references (CN1780901) was cited.

The Secondary Health School Trial Textbook Compiling Group for <Oraganic Chemistry>, Organic Chemistry, Jan. 1980, p. 149, Jiangsu Science and Technology Press.

"International Preliminary Report on Patentability of PCT counterpart application"; this report contains the following items :Form PCT/IB/338, PCT/IB/373, PCT/ISA237(cover sheet), PCT/ISA237(Box No. I),PCT/ISA237(Box No. V), PCT/ISA237(Supplemental Box), mailed on Mar. 22, 2012, which is English translation of "Written Opinion of the International Searching Authority", p. 1-p. 13.

"Office Action of Korean Counterpart Application", with machine English translation thereof, issued on Jul. 12, 2016, p. 1-p. 5.

"Office Action of Korea Counterpart Application" with English machine translation, issued on Apr. 6, 2016, p. 1-p. 5.

* cited by examiner

WATER-SOLUBLE CUTTING FLUID FOR SLICING SILICON INGOTS

CROSS-REFERENCE TO RELATED APPLICATION

This application is a 371 of international application of PCT application serial no. PCT/JP2010/005340, filed on Aug. 30, 2010, which claims the priority benefit of Japan application no. 2009-199489, filed on Aug. 31, 2009. The entirety of each of the above-mentioned patent applications is hereby incorporated by reference herein and made a part of this specification.

BACKGROUND OF THE INVENTION

Field of the Invention

The present application relates to a water-soluble cutting fluid for slicing silicon ingots.

Description of Related Art

When wire saws are used with the conventional cutting fluid for cutting silicon ingots, the surface refinement of the wafer is not satisfactory owing to the hardness of silicon ingots or insufficient lubricating capability of the conventional cutting fluid. Furthermore, as the cutting fluid is recycled during the cutting process of silicon ingots, disadvantages such as foaming have been reported.

Water-soluble cutting fluids have been proposed using, for example, the composition composed of polyalcohol such as propylene glycol or the like, aromatic polyprotic carboxylate salts (triethanolamine isophthalate or the like), alkylene oxide adducts of alkylene glycol such as polyethylene glycol or the like, and water (referring to the Patent reference 1).

In addition, in order to lower the danger of ignition and raise the cooling efficiency, the proportion of water of high specific heat is increased, which contributes to the erosion or tarnishment of the metal or wires used in the cutting apparatus.

The solutions for the above-mentioned issues have been developed by preparing the water-soluble cutting fluid with amine compounds to restrain erosion (referring to the Patent reference 2).

On the other hand, for preventing the generation of hydrogen from the reaction of water and silicon, the water-soluble cutting fluid having the oxidizing agent capable of oxidizing the silicon tiny particles generated during the cutting process is developed (referring to the Patent reference 3).

However, although the reaction of water and silicon is inhibited, the erosion issues of the processing apparatus or the wire of the fixed abrasion grain wire still exist.

Furthermore, during the cutting process, for the purposes of cooling or lubricating the wire and the processed silicon ingots and cleaning the processed surface, the cutting fluid is supplied to the process site during processing. However, recycling the cutting fluid causes foaming, and the cutting fluid as well as the foam may overflow to contaminate the surroundings.

Possible plans can be listed as the method of adding defoaming agents to the retention tank or method of coating defoaming agents to the foam-overflown site, etc., but no satisfactory results are achieved yet.

PRIOR TECHNICAL REFERENCES

Patent References

[Patent reference 1] Japan Pub. No. 2006-96951
[Patent reference 2] Japan Pub. No. 2005-15617
[Patent reference 3] Japan Pub. No. 2006-88455

SUMMARY OF THE INVENTION

Technical Problems to be Solved in the Present Invention

The present invention provides a water-soluble cutting fluid, which affords better lubricating capability in the slicing step of silicon ingots when compared with the pervious product and provides higher slicing efficiency without the foaming problems in the course of circulating the cutting fluid. When using the water-soluble cutting fluid, the erosion-proof capability of the metal or wires used in the cutting apparatus is superior and the generation of hydrogen from the reaction of water and silicon can be restrained.

Technical Means for Solving the Technical Problems

In order to accomplish the above objectives, the inventors have studied and achieved the present invention.

In the present application, a water-soluble cutting fluid for slicing silicon ingots is provided. The cutting fluid is characterized in that it includes a monoprotic or diprotic aliphatic carboxylic acid (A) having a carbon number (including the carbon in the carbonyl group) of 4~10, and either a polyprotic organic acid (B) with a difference of pKa (ΔpKa) between the acid dissociation constant of the first dissociation stage and the acid dissociation constant of the second dissociation stage in a specific range or a salt (BA) of said organic acid (B) as essential components. The manufacturing method of silicon ingot slices is provided. The method includes using the water-soluble cutting fluid for silicon ingots, and using the fixed abrasive grain wire for cutting the silicon ingots. The present invention provides silicon wafers that are fabricated by slicing the silicon ingots using the water-soluble cutting fluid, and electronic material fabricated from said silicon wafers.

The Effects of the Invention

The water-soluble cutting fluid of the present invention affords better lubricating capability in the slicing step of silicon ingots when compared with the pervious product and thus increases slicing efficiency.

In addition, since the generation of ignitable hydrogen from the reaction of water and silicon can be restrained, the safety of the cutting fluid is superior. Also, due to the low foaming property of the above mentioned water-soluble cutting fluid, the foaming problems in the course of recycling the cutting fluid will not occur.

DESCRIPTION OF EMBODIMENTS

In the present invention, the water-soluble cutting fluid for slicing silicon ingots is characterized in that it includes an aliphatic carboxylic acid (A) of a specific carbon number and polyprotic organic acid (B) of a specific ΔpKa or a salt (BA) of said organic acid (B) as essential components.

The aliphatic carboxylic acid (A), the essential component of the water-soluble cutting fluid for slicing silicon ingots in the present invention, usually has a carbon number (including the carbon in the carbonyl group) of 4~10, preferably of 6~10. When said carbon number is less than 4, its lubricating capability is insufficient. When said carbon number is more than 10, its water solubility is reduced.

The aliphatic carboxylic acid (A) is monoprotic or diprotic, preferably diprotic.

In addition, the aliphatic carboxylic acid (A) is a saturated or non-saturated aliphatic carboxylic acid, preferably a saturated aliphatic carboxylic acid.

The examples of the aliphatic carboxylic acid (A) may be aliphatic monocarboxylic acids or aliphatic dicarboxylic acids.

The aliphatic monocarboxylic acids can be exemplified as: butyric acid, valerianic acid, caproic acid, enanthic acid, caprylic acid, pelargonic acid, capric acid, crotonic acid, isocrotonic acid, sorbic acid, obtusilic acid or caproleic acid, etc.

The aliphatic dicarboxylic acids can be exemplified as: adipic acid, pimelic acid, suberic acid, azelaic acid, sebacic acid, citraconic acid, mesaconic acid, methylene succinic acid, allyl malonic acid, isopropylidene succinic acid or 2,4-hexadienedioic acid, etc.

For the lubricating capability and the anti-foaming capability of the aliphatic carboxylic acids (A), azelaic acid and sebacic acid are preferred.

Under the circumstances, the cutting fluid of this invention may be diluted by water or solutions mixed with organic solvent and water before application. Relative to the cutting fluid, the content of the aliphatic carboxylic acid (A) used in slicing is usually 0.01 wt %~10 wt %, preferably 0.01 wt %~5 wt %, more preferably 0.01 wt %~1 wt %.

When the above content is less than 0.01 wt %, the lubricating capability is insufficient. When the above content is more than 10 wt %, the anti-foaming capability is insufficient.

The polyprotic organic acid (B), another essential component of the water-soluble cutting fluid for slicing silicon ingots in the present invention, is a polyprotic organic acid with a ΔpKa in a specific range, where ΔpKa is the difference between the acid dissociation constant of the first dissociation stage and the acid dissociation constant of the second dissociation stage.

That is, the polyprotic organic acid (B) of this invention has ΔpKa of 0.9~2.3 as defined by the following formula (1):

$$\Delta pKa=(pKa_2)-(pKa_1) \quad (1)$$

wherein the n-protic organic acid (B) denoted as $H_nA$, at the first dissociation stage becomes $H_{n-1}A+H^+$ with an acid dissociation constant expressed as $pKa_1$, and at the second dissociation stage becomes $H_{n-2}A+H^+$ with an acid dissociation constant expressed as $pKa_2$. The difference of the afore-mentioned constants is ΔpKa.

Moreover, the acid dissociation constants $pKa_1$, $pKa_2$ represent the log values of the reciprocal of the dissociation constants of the compounds in the aqueous solution. pKa, for example, is illustrated in the pages 317-321 of "the Convenient manual of chemical fundamentals, II, the fourth version" (1993, Maruzen Co. Ltd.). ΔpKa can be calculated from the values of the tables thereof.

The polyprotic organic acid (B) has a ΔpKa of 0.9~2.3, preferably 1.4~2.2.

When the above ΔpKa is smaller than 0.9, the inhibition of hydrogen generation from the reaction of water and silicon is incomplete. When the above ΔpKa is larger than 2.3, the erosion-proof capability of the metal is downgraded.

The polyprotic organic acid (B) can be exemplified as polyprotic carboxylic acids, polyprotic sulfonic acids or polyprotic organic phosphoric acids, etc., preferably polyprotic carboxylic acids.

More preferably, the polyprotic carboxylic acids are an aromatic polyprotic carboxylic acid (B1) and/or a hydroxyl polyprotic carboxylic acid (B2).

The polyprotic organic acid (B) can be exemplified as: fumaric acid ($pKa_1$=2.85, $pKa_2$=4.10, ΔpKa=1.25), phthalic acid ($pKa_1$=2.75, $pKa_2$=4.93, ΔpKa=2.18), isophthalic acid ($pKa_1$=3.50, $pKa_2$=4.50, ΔpKa=1.00), terephthalic acid ($pKa_1$=3.54, $pKa_2$=4.46, ΔpKa=0.92), malic acid ($pKa_1$=3.24, $pKa_2$=4.71, ΔpKa=1.47), asparaginic acid ($pKa_1$=1.93, $pKa_2$=3.70, ΔpKa=1.77), m-aminobenzoic acid ($pKa_1$=3.12, $pKa_2$=4.72, ΔpKa=1.60), citric acid ($pKa_1$=2.90, $pKa_2$=4.34, ΔpKa=1.44) or succinic acid ($pKa_1$=4.00, $pKa_2$=5.20, ΔpKa=1.20) etc.

From the aspect of restraining the hydrogen generation from the reaction of water and silicon, the polyprotic organic acid (B) is preferably phthalic acid, malic acid or citric acid.

The salts (BA) of the polyprotic organic acid (B) can be exemplified as: ammonium salts (BA1) of the polyprotic organic acid (B), aliphaticamine salts (BA2) of the polyprotic organic acid (B), inorganic alkali salts (BA3) of the polyprotic organic acid (B), alkanolamine salts (BA4) of the polyprotic organic acid (B) or the combinations of these salts.

The aliphaticamine salts (BA2) of the organic acid (B) can be exemplified as: the salts of the organic acid (B) with methylamine, ethylamine, propylamine, isopropylamine, butylamine, hexylamine, dimethylamine, ethylmethylamine, propylmethylamine, butylmethylamine, diethylamine, propylethylamine, diisopropylamine, dihexylamine, ethylenediamine, propylenediamine, trimethylene diamine, tetramethylene diamine, hexamethylene diamine, piperidine, piperazine, quinuclidine, 1,4-diazabicyclo[2.2.2]octane (DABCO), 1,8-diazabicyclo[5.4.0]undec-7-ene (DBU) or 1,5-diazabicyclo(4.3.0)non-5-ene (DBN), etc.

The inorganic alkali salts (BA3) of the organic acid (B) can be exemplified as lithium salts, sodium salts, potassium salts, calcium salts or magnesium salts, etc. of the organic acid (B).

The alkanolamine salts (BA4) of the organic acid (B) can be exemplified as the salts of the organic acid (B) with monoethanolamine, diethanolamine, triethanolamin, N-methyl-diethanolamine, N,N-dimethyl ethanolamine, N,N-diethyl ethanolamine, 2-amino-2-methyl-1-propanol, N-(2-aminoethyl)ethanolamine, 2-(2-amino ethoxy)ethanol, the ethylene oxide adducts of ethylenediamine (adduct mole number being 10) or hydroxylamines, etc.

The salts (BA) of the polyprotic organic acid (B) can be exemplified as: fumarate salts, phthalate salts, isophthalate salts, terephthalate salts, malate salts, asparaginate salts, m-aminobenzate salts, citrate salts, succinate salts, etc.

In replacement of the polyprotic organic acid (B), the salts (BA) of the organic acid (B) can be used or the combination of the organic acid (B) and the salts (BA) of the organic acid (B) can be used. In addition, it is possible to mix a part of or the whole polyprotic organic acid (B) with additional prepared basic compounds in the system to form salts.

The organic acid (B) of this invention is included for promoting the inhibition of hydrogen generation from the reaction of water and silicon.

Relative to the used cutting fluid, the content of the organic acid (B) is usually 0.01 wt %~10 wt %, preferably 0.05 wt %~5 wt %, more preferably 0.1 wt %~1 wt %.

When the above content is less than 0.01 wt %, the inhibition of the reaction is incomplete. When the above content is more than 10 wt %, the effects are equivalent and financially valueless.

The water solubility of the water-soluble cutting fluid of this invention means that no separation occurs when the cutting fluid is mixed with water in any ratios.

Under the circumstances, the cutting fluid of this invention may be diluted by water or solutions mixed with organic solvent and water in any ratios before application.

To lower the viscosity for stable flow circulation or for better dispersion of the slicing powders, the water-soluble cutting fluid for slicing silicon ingots of this invention preferably includes polyoxyalkylene adducts (C) as represented by the following formula (2).

$$R^1O\text{-}(AO)_n\text{—}R^2 \quad (2)$$

[wherein $R^1$ and $R^2$ individually represent hydrogen or an alkyl group; AO represents oxyalkylene groups having a carbon number of 2~4; $(AO)_n$ represents adduct forms of one or two or more types of alkylene oxides, wherein when there are two types of alkylene oxides they can be adducted in blocks or at random; n represents the average adduct mole number of AO and is a number of 1~10].

In the formula (2), $R^1$ and $R^2$ individually represent hydrogen or an alkyl group.

The alkyl group can be exemplified as an alkyl group having a carbon number of 1~6, such as methyl or ethyl, etc. $R^1$ and $R^2$ are preferably hydrogen, methyl or ethyl.

AO in the formula (2) represents oxyalkylene groups having a carbon number of 2~4, and can be exemplified as oxyethylene, oxypropylene or oxybutylene, etc. Regarding water solubility, oxyethylene or oxypropylene are preferred.

$(AO)_n$ represents adduct forms of one or two or more types of alkylene oxides, wherein when there are two types of alkylene oxides, they can be adducted in blocks or at random.

n represents the average adduct mole number of AO and is usually a number of 1~10, preferably 1~5, more preferably 1~3. When the average adduct mole number is more than 10, the viscosity is too high and foaming problems occur.

The polyoxyalkylene adduct (C) of this invention has a number average molecular weights of usually 500 or less, preferably 300 or less and more preferably 200 or less.

When the number average molecular weight is more than 500, the viscosity is too high and foaming problems occur.

The polyoxyalkylene adducts (C) can be exemplified as water-soluble glycols such as alkylene glycol, polyalkylene glycol or the like, or water-soluble ethers such as alkyl ethers of alkylene glycol, alkyl ethers of polyalkylene glycol or the like.

Among the polyoxyalkylene adducts (C), alkylene glycol can be exemplified as: ethylene glycol, 1,2-propylene glycol, 1,3-propylene glycol, 1,2-butylene glycol, 1,3-butylene glycol, 1,4-butylene glycol or the like.

Among the polyoxyalkylene adducts (C), polyalkylene glycol can be exemplified as: polyethylene glycol (diethylene glycol, triethylene glycol or the like), poly-1,2-propylene glycol [di-1,2-propylene glycol or the like], poly-1,3-propylene glycol poly-1,2-butylene glycol, poly-1,3-butylene glycol or poly-1,4-butylene glycol, etc.

Among the polyoxyalkylene adducts (C), monoalkyl ethers or dialkyl ethers of alkylene glycol can be exemplified as: ethylene glycol monomethylether, ethylene glycol dimethylether, 1,2-propylene glycol monomethylether, 1,2-propylene glycol dimethylether or the like.

Among the polyoxyalkylene adducts (C), monoalkyl ethers or dialkyl ethers of polyalkylene glycol can be exemplified as: polyethylene glycol monomethylether [diethylene glycol monomethylether, triethylene glycol monomethylether or the like], polyethylene glycol dimethylether [diethylene glycol dimethylether, triethylene glycol dimethylether or the like] or poly-1,2-propylene glycol monomethylether [di-1,2-propylene glycol monomethylether or the like], etc.

Among the polyoxyalkylene adducts (C), from the processing aspect, alkylene glycol, alkylene glycol monoalkyl ether, polyalkylene glycol and polyalkylene glycol monoalkyl ether are preferred. Alkylene glycol, polyalkylene glycol and monomethylether and monoethylether of these alkylene glycols with the carbon number of the oxyalkylene group being 2~4 are more preferred.

Even more preferred are 1,2-propylene glycol, diethylene glycol, 1,2-propylene glycol monomethylether, 1,2-propylene glycol dimethylether, diethylene glycol monomethylether and diethylene glycol dimethylether.

From the aspect of water dissolubility, the polyoxyalkylene adducts (C) of this invention has a hydrophile-lipophile balance (HLB) value of 8~45, preferably 10~45, at which range, the water dissolubility is excellent.

Herein, the HLB value is the index for the balance of hydrophilicity and lipophilicity, for example, using the estimated values given by the Oda method as described in the book, "Emulsifying and dissolvable technology" (1976, Engineering Books, Co. Ltd.) or "Introduction of new surfactants" (1996, auther Fujimoto Takehiko), pages 132 & 197~199, rather than the estimated valued given by the Griffin method.

Moreover, to acquire the organic values and inorganic values of HLB, the values recited in the table in the book "Organic constructions—fundamentals and applications" (1984, Sankyo, Co. Ltd.) or "Introduction of new surfactants" (1996, auther Fujimoto Takehiko), page 198, may be used.

Relative to the used cutting fluid, the content of the polyoxyalkylene adducts (C) in the cutting fluid of this invention is preferably 60 wt %~90 wt %, more preferably 65 wt %~80 wt %.

Relative to the cutting fluid, the water content in the cutting fluid of this invention is preferably 10 wt %~40 wt %, more preferably 20 wt %~35 wt %.

Relative to the polyoxyalkylene adducts (C), the content of the aliphatic carboxylic acid (A) is usually 0.001 wt %~1.0 wt %, preferably 0.001 wt %~0.5 wt %, more preferably 0.001 wt %~0.1 wt %.

Relative to the polyoxyalkylene adducts (C), the total content of the aromatic polyprotic carboxylic acid (B1) and the hydroxyl polyprotic carboxylic acid (B2) is usually 0.01 wt %~10 wt %, preferably 0.01 wt %~5 wt %, more preferably 0.01 wt %~3 wt %.

The water-soluble cutting fluid of this invention further includes a pH adjusting agent (D) or a dispersant (E), etc.

The pH adjusting agent (D) can be exemplified as inorganic acids such as hydrochloric acid or the like or alkali metal hydroxides such as sodium hydroxide, potassium hydroxide or the like.

The pH adjusting agent is used to adjust the cleaning solution for not being strongly acidic or basic when using the water-soluble cutting fluid of this invention for cleaning of the slicing processed article. Preferably, the pH adjusting agent is added to prepare an aqueous solution of 1 wt % having a pH value of 5~9, more preferably 5~8. Relative to the cutting solution, the content of the pH adjusting agent is 5 wt % or less.

The dispersant (E) can be exemplified as: naphthalene sulfonic acid formalin condensate and/or salts thereof, polycarboxylate salts, polystyryl sulfonate salts, polyethylene sulfonate salts, polyalkylene glycol sulfuric acid esters, polyvinyl alcohol phosphoric acid esters, tricyanic acid sulfonate salts or lignin sulfonate salts, etc. Relative to the adjust the pH value to about 5.8 to prepare the water-soluble cutting fluid of Examples 1~7 and Comparative Examples 1~6.

TABLE 1

| | | | Examples | | | | | | | Comparative examples | | | | | |
|---|---|---|---|---|---|---|---|---|---|---|---|---|---|---|---|
| | | | 1 | 2 | 3 | 4 | 5 | 6 | 7 | 1 | 2 | 3 | 4 | 5 | 6 |
| Mixing ratios (parts by weight) of water-soluble cutting fluid | Aliphatic carboxylic acid (A) | azelaic acid (A-1) | 0.5 | 0.1 | 0.5 | 0.1 | 0.5 | 0.5 | 0.5 | — | — | — | — | 0.8 | 0.5 |
| | | oxalic acid (A'-1) | — | — | — | — | — | — | — | 0.5 | — | — | — | — | — |
| | Polyprotic organic acid (B) or salts thereof | citric acid (B-1) | 0.3 | 0.3 | 0.3 | 0.3 | — | — | — | 0.3 | — | 0.3 | — | — | — |
| | | phthalic acid (B-2) | — | — | — | — | 0.3 | — | — | — | — | — | — | — | — |
| | | isophthalic acid (B-3) | — | — | — | — | — | 0.3 | — | — | 0.5 | — | — | — | — |
| | | phthalate salt (BA-1) | — | — | — | — | — | — | 0.3 | — | — | — | 0.5 | — | — |
| | | maleic acid (B'-1) | — | — | — | — | — | — | — | — | — | — | — | — | 0.3 |
| | Polyoxyalkylene adducts (C) | propylene glycol (C-1) | — | — | 70 | 70 | 70 | 70 | 70 | — | — | — | 74 | 74 | — |
| | | diethylene glycol (C-2) | 30 | 30 | — | — | — | — | — | 30 | 30 | 30 | — | — | 30 |
| | | diethylene glycol monomethyl ether (C-3) | 40 | 40 | — | — | — | — | — | 40 | 40 | 40 | — | — | 40 |
| | | polyethylene glycol (MW:1000) (C'-1) | — | — | — | — | — | — | — | — | — | — | 10.5 | 10.5 | — |
| | pH adjusting agent | 50% potassium hydroxide aqueous solution | 0.2 | 0.2 | 0.2 | 0.2 | 0.2 | 0.2 | 0.2 | 0.2 | 0.2 | 0.2 | — | — | 0.2 |
| | Dispersant | naphthalene sulfonic acid formalin condensate | 0.5 | 0.5 | 0.5 | 0.5 | 0.5 | 0.5 | 0.5 | 0.5 | 0.5 | 0.5 | — | — | 0.5 |
| | Water | | 29 | 29 | 29 | 29 | 29 | 29 | 29 | 29 | 29 | 29 | 15 | 15 | 29 |
| Property evaluation | Lubricating capability (friction factor) | | 0.27 | 0.34 | 0.25 | 0.30 | 0.19 | 0.23 | 0.23 | 0.52 | 0.47 | 0.53 | 0.47 | 0.21 | 0.24 |
| | Inhibition of reaction | | ○ | ○ | ○ | ○ | ○ | ○ | ○ | ○ | ○ | ○ | ○ | x | x |
| | Anti-foaming capability | | ○ | ○ | ○ | ○ | ○ | ○ | ○ | ○ | ○ | ○ | x | x | ○ |

cutting fluid, the content of the dispersant is 0.01 wt %~5 wt %, more preferably 0.1 wt %~1 wt %. When the content of said dispersant is 0.01 wt % or more, the dispersing effects become evident. When the content of said dispersant is 5 wt % or less, there is the tendency that the cutting powders are unable to aggregate.

The water-soluble cutting fluid of this invention is suitable for the application of the wires for slicing processing of the silicon ingots.

The methods for processing the silicon ingots can be exemplified as the method of using disengaged abrasive grains wire and the method of using fixed abrasive grain wire. The water-soluble cutting fluid of this invention is especially suitable for slicing processing of the silicon ingots using fixed abrasive grain wire.

EXAMPLES

The following paragraphs describe the examples and comparative examples to further illustrate the present invention, but the scopes of the present invention are not limited by the examples. Herein, "%" used later represents wt %, while "ratio" or "part" refers to ratio or part by weight.

Examples 1~7 and Comparative Examples 1~6

The mixing ratios (parts by weight) recited in Table 1 are used to prepare the components of the water-soluble cutting fluid except for the potassium hydroxide aqueous solution. The potassium hydroxide aqueous solution is then used to In addition, "phthalate salt (BA-1)" employs salts of phthalate/triethanol amine (1:2 moles).

Methods for evaluating the properties of the water-soluble cutting fluid

The obtained water-soluble cutting fluid is tested for the lubricating capability, the inhibition of the reaction and anti-foaming capability and then evaluated, and the results are shown in Table 1.

(a) Tests for the Lubricating Capability (Friction Factor)

Friction factor is obtained using the pin(ball)-on-disk type tribometer (Rhesca product, FRP-2000) to test the friction factors between the stainless steel ball and the silicon wafer immersed in 20 g water-soluble cutting fluid and is thus used to evaluate the lubricating capability.

The tests of the lubricating capability are performed under the following conditions.

Silicon wafer: test slices 40 mm×40 mm

Load: 100 g

Liner velocity: 5.23 cm/s

Test temperature: 25° C.

Usually, it is expected to have a friction factor of 0.40 or less. If the friction factor is large, the lubricating capability is insufficient, and the surface refinement of the wafer becomes unsatisfactory.

(b) Inhibition of the Reaction

The inhibition of hydrogen generation from the reaction of water and silicon is evaluated by performing the following methods.

(1) To the glass flask, 18 g of water-soluble cutting fluid and 2 g of silicon powder (fabricated by High purity chemical laboratory, purity 99% and the average particle size 1 μm), are added and sonicated for two minutes using 38 kHz supersonic cleaning device, dispersing the silicon powders to obtain the slurry.

(2) One end of the glass tube is drawn into a graduated cylinder filled of water and inverted in the tank, and at the other end, the afore-mentioned slurry is placed in a glass flask sealed with a rubber stopper having a hole.

The arrangement as follows: the neck of the glass flask that holds the slurry is sealed by the rubber stopper connected to the glass tube. The other end of the glass tube is drawn into the graduated cylinder filled of water and inverted in the tank, so that the generated hydrogen replaces the water in the graduated cylinder.

(3) The whole kit, including the tank, the graduated cylinder, glass tube and the glass flask with the slurry, is placed in the thermostatic high temperature oven at 60° C. for two hours and the generated hydrogen during this period is drawn to the graduated cylinder using water displacement method, so as to measure the hydrogen generation amounts.

The inhibition of hydrogen generation is evaluated by the following principles.

○: hydrogen generation amount less than 10 ml

Δ: hydrogen generation amount being 10 ml~20 ml x: hydrogen generation amount more than 20 ml (c) Anti-Foaming Test (Foaming)

Anti-foaming test were done by using high temperature and high pressure fluidity testing apparatus (Tsujii Dyeing Machine Manufacturing product, LJ-2000) under the following conditions.

The amount of water-soluble cutting fluid: 1300 g

Flow: 2.9 L/min

Circulate time: 20 minutes

The starting temperature of the test: 25° C.

The anti-foaming capability is evaluated based on the following principles: allowing the cutting fluid be recycled and measuring the height of the foam after 20 minutes of circulating.

○: less than 15 mm

Δ: 15 mm~25 mm x: more than 25 mm

As shown in Table 1, the water-soluble cutting fluid of Examples 1~7 in this invention has low friction factors and affords excellent lubricating capability, as well as the anti-foaming capability and the inhibition of the reaction.

On the other hand, Comparative example 1 using oxalic acid with less carbon numbers as the essential component aliphatic carboxylic acid and Comparative examples 2~4 without using aliphatic carboxylic acids have high friction factors and afford poor lubricating capability.

Comparative example 5 merely using azelaic acid with ΔpKa of 0.73 as the aliphatic carboxylic acid and not including the organic acid with ΔpKa in a specific range presents inferior inhibition of the reaction. Comparative example 6 using maleic acid with ΔpKa of 4.08 also presents inferior inhibition of the reaction.

On the other hand, Comparative examples 4 & 5 using high molecular weight polyethylene glycol as the polyoxyalkylene adduct present inferior anti-foaming capability.

APPLICATIONS IN THE INDUSTRY

The water-soluble cutting fluid of the present invention is valuable as the water-soluble cutting fluid used for slicing silicon ingots, as it is excellent in lubricating capability, in the inhibition of hydrogen generation from the reaction of water and silicon and in anti-foaming capability.

The silicon wafers fabricated by slicing silicon ingots using the water-soluble cutting fluid of the present invention can be used as materials for memories, oscillators, amplifiers, transistors, diodes, solar cells and large-scale integration circuits (LSI), and further applied for solar power plants, personal computers, mobile phones, displays or audio systems, etc.

In addition, the water-soluble cutting fluid of the present invention can be useful as the cutting fluid for processing tough materials or articles, such as rock crystal, silicon carbide, sapphire or the like.

What is claimed is:

1. A water-soluble cutting fluid for slicing silicon ingots characterized in comprising an azelaic acid (A), either a polyprotic organic acid (B) with ΔpKa of 0.9~2.3 as defined by the following formula (1) or an inorganic alkali salts (BA3) of said polyprotic organic acid (B) as essential components, a compound (C), a 50 wt % potassium hydroxide aqueous solution as a pH adjusting agent (D), a naphthalene sulfonic acid formalin condensate as a dispersant (E), and a water:

$$\Delta pKa=(pKa_2)-(pKa_1) \quad (1)$$

wherein said polyprotic organic acid (B) comprises citric acid, phthalic acid, or isophthalic acid, said inorganic alkali salts (BA3) comprises citrate salts, phthalate salts, or isophthalate salts having a base derived from lithium, sodium, potassium, calcium, or magnesium, and a dissociation stage, at which said polyprotic organic acid (B) denoted as n-protic acid $H_nA$ becomes $H_{n-1}A+H^+$, is numbered as 1 with an acid dissociation constant expressed as $pKa_1$, and the dissociation stage at which said polyprotic organic acid (B) becomes $H_{n-2}A+H^+$ is numbered as 2 with an acid dissociation constant expressed as $pKa_2$;

wherein said compound (C) is propylene glycol, wherein relative to said cutting fluid for slicing silicon ingots, the content of said compound (C) in the said cutting fluid is 60 to 90 wt %.

2. The water-soluble cutting fluid of claim 1, wherein said polyprotic organic acid (B) is an aromatic polyprotic carboxylic acid (B1) and/or a hydroxyl polyprotic carboxylic acid (B2).

3. The water-soluble cutting fluid of claim 1, wherein said compound (C) has a hydrophile-lipophile balance (HLB) value of 8~45.

4. The water-soluble cutting fluid of claim 1, wherein a content of said azelaic acid (A) is 0.001 wt %~1.0 wt %, relative to said compound (C).

5. The water-soluble cutting fluid of claim 1, wherein said polyprotic organic acid (B) is an aromatic polyprotic carboxylic acid (B1) and/or a hydroxyl polyprotic carboxylic acid (B2), and a total content of said aromatic polyprotic carboxylic acid (B1) and said hydroxyl polyprotic carboxylic acid (B2) is 0.01 wt %~10 wt %, relative to said compound (C).

6. A method for manufacturing slice of silicon ingot, comprising using the water-soluble cutting fluid of claim 1 and using a fixed abrasive grain wire for slicing the silicon ingot.

* * * * *